US012129329B2

(12) United States Patent
Emmrich-Smolczyk et al.

(10) Patent No.: US 12,129,329 B2
(45) Date of Patent: Oct. 29, 2024

(54) PRODUCTION OF POLYURETHANE SYSTEMS

(71) Applicant: Evonik Operations GmbH, Essen (DE)

(72) Inventors: Eva Emmrich-Smolczyk, Essen (DE); Mladen Vidakovic, Duisburg (DE); Kai-Oliver Feldmann, Essen (DE); Annegret Terheiden, Alpen (DE)

(73) Assignee: Evonik Operations GmbH, Essen (DE)

( * ) Notice: Subject to any disclaimer, the term of this patent is extended or adjusted under 35 U.S.C. 154(b) by 77 days.

(21) Appl. No.: 17/214,998

(22) Filed: Mar. 29, 2021

(65) Prior Publication Data

US 2021/0214488 A1    Jul. 15, 2021

Related U.S. Application Data

(62) Division of application No. 16/127,663, filed on Sep. 11, 2018, now Pat. No. 10,995,174.

(30) Foreign Application Priority Data

Sep. 25, 2017  (EP) .................... 17192836

(51) Int. Cl.
C08G 18/08    (2006.01)
C08G 18/16    (2006.01)
C08G 18/18    (2006.01)
C08G 18/20    (2006.01)
C08G 18/22    (2006.01)
C08G 18/32    (2006.01)
C08G 18/48    (2006.01)
C08G 18/66    (2006.01)
C08G 18/76    (2006.01)
C08K 3/36     (2006.01)
C08K 5/17     (2006.01)
C08K 5/31     (2006.01)
C08K 9/12     (2006.01)

(52) U.S. Cl.
CPC ..... *C08G 18/3203* (2013.01); *C08G 18/0871* (2013.01); *C08G 18/1808* (2013.01); *C08G 18/1825* (2013.01); *C08G 18/185* (2013.01); *C08G 18/2027* (2013.01); *C08G 18/2036* (2013.01); *C08G 18/3268* (2013.01); *C08G 18/3275* (2013.01); *C08G 18/4816* (2013.01); *C08G 18/4829* (2013.01); *C08G 18/6688* (2013.01); *C08G 18/7671* (2013.01); *C08K 5/17* (2013.01); *C08K 9/12* (2013.01); *C08G 2110/0008* (2021.01); *C08G 2110/0016* (2021.01); *C08G 2110/0025* (2021.01); *C08G 2110/0083* (2021.01); *C08K 5/31* (2013.01)

(58) Field of Classification Search
CPC ............ C08G 18/1808; C08G 18/1825; C08G 18/3268
See application file for complete search history.

(56) References Cited

U.S. PATENT DOCUMENTS

| | | |
|---|---|---|
| 3,933,695 A | 1/1976 | Omietanski et al. |
| 4,042,540 A | 8/1977 | Lammerting et al. |
| 4,147,847 A | 4/1979 | Schweiger |
| 4,855,379 A | 8/1989 | Budnik et al. |
| 5,306,737 A | 4/1994 | Burkhart et al. |
| 5,321,051 A | 6/1994 | Burkhart et al. |
| 5,357,018 A | 10/1994 | Burkhart et al. |
| 5,804,647 A | 9/1998 | Nachtkamp et al. |
| 5,844,010 A | 12/1998 | Burkhart et al. |
| 6,540,936 B1 | 4/2003 | Osamu et al. |
| 6,855,739 B2 | 2/2005 | Becker et al. |
| 7,671,103 B2 | 3/2010 | Eilbracht et al. |
| 8,642,659 B2 | 2/2014 | Springer et al. |
| 10,100,148 B2 | 10/2018 | Emmrich-Smolczyk et al. |
| 10,995,174 B2 | 5/2021 | Emmroch-Smolczyk et al. |
| 2004/0198851 A1 | 10/2004 | Becker et al. |
| 2006/0167125 A1 | 7/2006 | Bauer et al. |
| 2007/0007295 A1 | 1/2007 | Wu |
| 2007/0072951 A1 | 3/2007 | Bender et al. |
| 2007/0093565 A1 | 4/2007 | Glos et al. |
| 2008/0146688 A1 | 6/2008 | Glos et al. |
| 2008/0153935 A1 | 6/2008 | Wuestenek |
| 2009/0088489 A1 | 4/2009 | Terheiden et al. |
| 2009/0247690 A1* | 10/2009 | Varnhorn ............ C08L 23/0853 524/502 |
| 2010/0240786 A1 | 9/2010 | Glos et al. |

(Continued)

FOREIGN PATENT DOCUMENTS

CA    2927891 A1    5/2015
CN   101378788 B    4/2013

(Continued)

OTHER PUBLICATIONS

Ferenz et al., U.S. Appl. No. 17/523,059, filed Nov. 10, 2021.
Klostermann et al., U.S. Appl. No. 17/321,609, filed May 17, 2021.
Klostermann et al., U.S. Appl. No. 17/331,429, filed May 26, 2021.
Klostermann et al., U.S. Appl. No. 17/331,452, filed May 26, 2021.
Klostermann et al., U.S. Appl. No. 17/333,559, filed May 28, 2021.
Klostermann et al., U.S. Appl. No. 17/612,663, filed Nov. 19, 2021.
Klostermann et al., U.S. Appl. No. 17/612,690, filed Nov. 19, 2021.
Klostermann et al., U.S. Appl. No. 17/617,020, filed Dec. 7, 2021.
Klostermann et al., U.S. Appl. No. 17/617,127, filed Dec. 7, 2021.
Modro et al., U.S. Appl. No. 17/367,456, filed Jul. 5, 2021.
Herrmann et al., U.S. Appl. No. 17/448,240, filed Sep. 21, 2021.

(Continued)

*Primary Examiner* — Melissa A Rioja
(74) *Attorney, Agent, or Firm* — Grüneberg and Myers PLLC

(57) ABSTRACT

The invention provides a process for production of polyurethane systems by reacting at least one polyol component with at least one isocyanate component in the presence of one or more catalysts for the isocyanate-polyol and/or isocyanate-water reactions and/or the trimerization of isocyanate, wherein said reacting is carried out in the presence of carrier material and polyamine P.

14 Claims, No Drawings

(56) References Cited

U.S. PATENT DOCUMENTS

| | | |
|---|---|---|
| 2010/0297053 A1 | 11/2010 | Hirukawa |
| 2010/0298455 A1 | 11/2010 | Henning et al. |
| 2010/0303752 A1 | 12/2010 | Hametner et al. |
| 2011/0034576 A1 | 2/2011 | Henning et al. |
| 2011/0257280 A1 | 10/2011 | Glos et al. |
| 2011/0306694 A1 | 12/2011 | Glos et al. |
| 2012/0190760 A1 | 7/2012 | Henning et al. |
| 2012/0190762 A1 | 7/2012 | Hubel et al. |
| 2012/0195845 A1 | 8/2012 | Hirukawa |
| 2013/0041057 A1 | 2/2013 | Emmrich Smolczyk et al. |
| 2013/0041058 A1 | 2/2013 | Emmrich Smolczyk et al. |
| 2013/0072585 A1 | 3/2013 | Glos et al. |
| 2013/0150472 A1 | 6/2013 | Hubel et al. |
| 2013/0190414 A1 | 7/2013 | Terheiden et al. |
| 2014/0221518 A1 | 8/2014 | Emmrich Smolczyk et al. |
| 2015/0368420 A1 | 12/2015 | Schmitz et al. |
| 2016/0040050 A1 | 2/2016 | Muñoz et al. |
| 2016/0068647 A1 | 3/2016 | Emmrich Smolczyk et al. |
| 2016/0304666 A1 | 10/2016 | Emmrich Smolczyk et al. |
| 2016/0304685 A1 | 10/2016 | Emmrich Smolczyk et al. |
| 2018/0044463 A1 | 2/2018 | Gunther et al. |
| 2020/0377684 A1 | 12/2020 | Hermann et al. |
| 2021/0015269 A1 | 1/2021 | Terheiden et al. |
| 2021/0047474 A1 | 2/2021 | Klostermann et al. |
| 2021/0253780 A1 | 8/2021 | Wessely et al. |

FOREIGN PATENT DOCUMENTS

| | | |
|---|---|---|
| CN | 20105368288 A | 3/2016 |
| CN | 105745244 A | 7/2016 |
| DE | 2533074 A1 | 3/1976 |
| DE | 4229402 A1 | 3/1994 |
| DE | 4239054 A1 | 5/1994 |
| DE | 10003156 A1 | 8/2001 |
| DE | 10258046 A1 | 6/2004 |
| DE | 102004001408 A1 | 7/2005 |
| EP | 0 493 836 A1 | 7/1992 |
| EP | 0 533 202 A1 | 3/1993 |
| EP | 0 780 414 A2 | 6/1997 |
| EP | 0 839 852 A2 | 5/1998 |
| EP | 0 867 465 A1 | 9/1998 |
| EP | 1 537 159 A1 | 6/2005 |
| EP | 1 544 235 A1 | 6/2005 |
| EP | 2300418 | 3/2011 |
| GB | 657753 | 9/1951 |
| JP | S51-077650 A | 7/1976 |
| JP | 2005-232197 A | 9/2005 |
| WO | 2005/118668 A1 | 12/2005 |
| WO | 2008/080184 | 7/2008 |
| WO | 2009/117479 A2 | 9/2009 |
| WO | 2009156241 A1 | 12/2009 |
| WO | 2010081601 A1 | 7/2010 |
| WO | 2013156237 A3 | 10/2013 |
| WO | 2015071063 A1 | 5/2015 |
| WO | 2016005149 A1 | 1/2016 |
| WO | 2016020200 A1 | 2/2016 |
| WO | 2016/201615 A1 | 12/2016 |

OTHER PUBLICATIONS

Emmrich-Smolczyk et al., U.S. Appl. No. 17/622,095, filed Jul. 13, 2020.

G. Oertel, "Polyurethane Flexible Foams", Polyurethane Handbook, 2nd edition, Chapter 5, Hanser/Gardner Publications Inc, Cincinnati, Ohio, 1994, pp. 177-245.

Güthner et al., "Guanidine and Derivatives", Ullmann's Encyclopedia of Industrial Chemistry, vol. 17, 2012, pp. 175-189.

Katrizky et al., "Chemical Litigation of S-Scylated Cysteine Peptides to Form Native Peptides via 5-, 11-, and 14-Membered Cyclic Transition States", Journal of Organic Chemistry, vol. 76, 2011, pp. 85-96.

VDA 275 "Moldings for the Automotive Interior-Determination of Formaldehyde Evolution" Measurement by the modified bottle method; source VDA275, Jul. 1994, www.vda.de for their formaldehyde and acetaldehyde content.

* cited by examiner

PRODUCTION OF POLYURETHANE SYSTEMS

CROSS REFERENCE TO RELATED APPLICATIONS

This application is a divisional application of U.S. application Ser. No. 16/127,663 filed Sep. 11, 2018, currently pending, which claims the benefit of European Patent Application No 17192836.9 filed Sep. 25, 2017, entitled "Production of polyurethane systems", the disclosures of which are expressly incorporated by reference herein in its entirety.

FIELD

The invention resides in the field of polyurethanes and relates in particular to a process for production of polyurethane systems by reacting at least one polyol component with at least one isocyanate component in the presence of one or more catalysts for the isocyanate-polyol and/or isocyanate-water reactions and/or the trimerization of isocyanate, wherein said reacting is carried out in the presence of a carrier material and of polyamine P, wherein the carrier material used is for example fumed silica, and also to polyurethane systems thus obtained.

Polyurethane systems for the purposes of this invention are, for example, polyurethane coatings, polyurethane adhesives, polyurethane sealants, polyurethane elastomers or, in particular, polyurethane foams.

BACKGROUND

Polyurethanes have outstanding mechanical and physical properties and so are used in a very wide variety of fields. The field of foams is a particularly important market for various polyurethanes, such as conventional flexible foams based on ether and ester polyols, cold-cure foams (frequently also referred to as HR foams), rigid foams, integral foams and microcellular foams and also foams with properties between these classifications, for example semi-rigid systems. For instance, rigid foams are used as inner roofliner, ester foams as interior door trim and also for die-cut sun visors, cold-cure and flexible foams are used for seat systems and mattresses. Adhesives and coatings are another field of use for polyurethanes in which they are notable for their excellent properties.

Polyurethane foams evolve aldehydes in the course of production and storage. Many consumers go out of their way to avoid using aldehyde-emitting products because of health concerns, however unjustified they may be.

Moreover, in recent times, the Chinese authorities in particular have increased demands and are imposing, for example, very strict limit values on interior emissions for automobiles sold in China. The particular focus here is not only on aromatic hydrocarbons but also again on the aldehydes. Very generally there is thus a desire for polyurethane foams that evolve as low a level of aldehydes as possible.

Different approaches have already been tried to satisfy this desire. WO 2009/117479 for instance proceeds on the assumption that the formaldehyde comes from the raw material, more particularly suspecting it to be present in the anime catalysts used (which are tertiary amines). Low formaldehyde emissions are proposed to be achieved in this reference by adding a primary amine to the tertiary amine catalyst. Preference is expressed for the use of dimethylaminopropylamine.

DE 10003156 A1 does not relate directly to low-emission foams, but addresses the problem of developing polymers having very good adsorptive capabilities in respect of various compounds, in particular in respect of heavy metal ions. The solution proposed to this problem takes the form of polyurethane foams comprising ethyleneimine, polyethyleneimine, polyvinylamine, carboxymethylated polyethyleneimines, phosphonomethylated polyethyleneimines, quaternized polyethyleneimines and/or dithiocarbamitized polyethyleneimines. These polyurethane foams are also useful for adsorbing organic substances such as, for example, formaldehyde.

DE 10258046 A1 addresses the problem of producing polyurethane foams having a reduced level of formaldehyde emission. In contradistinction to DE 10003156 A1, the problem addressed by DE 10258046 A1 is therefore that of reducing the formaldehyde emissions from the PU foam as such and not that of adsorbing formaldehyde from the ambient air. The solution proposed to this problem is a process that involves the admixture of amino-containing polymers to the polyurethane foam, wherein the admixture may take place before and/or during the production of the polyurethane foam.

It was however determined in the context of the present invention that, according to the polyurethane formulation used, the use of aldehyde-scavenging substances can lead to foam defects and, under some circumstances, can also affect the efficacy of aldehyde absorption. In the case of use of aldehyde-scavenging substances known from the prior art, the processibility of the foams can suffer under some circumstances, and the values for the compressibility—'force-to-crush' (FTC)—of the foams can particularly deteriorate.

Therefore, providers of polyurethanes, in particular polyurethane foams, are still in need of further solutions for reducing the emission of aldehydes without losses in respect of the processibility or the mechanical properties.

SUMMARY

Against this background, the specific problem addressed by the present invention was that of providing polyurethanes, in particular polyurethane foams, where there is a reduced level of aldehyde emissions and where processibility is better maintained, in particular with regard to the values for compressibility—force-to-crush (FTC for short)—of the foams.

The inventors, then, found that, surprisingly, this problem is solved when the production of polyurethane systems is carried out in the presence of a carrier material and of polyamine P.

DETAILED DESCRIPTION

The invention thus has for its subject-matter a process for production of polyurethane systems by reacting at least one polyol component with at least one isocyanate component in the presence of one or more catalysts for the isocyanate-polyol and/or isocyanate-water reactions and/or the trimerization of isocyanate, wherein said reacting is carried out in the presence of a carrier material and of polyamine P.

The carrier material is preferably a pulverulent solid. The carrier material used is especially fumed silica or precipitated silica, advantageously within the primary particle size range of especially 5 to 100 nm and with specific BET surface areas especially of 30 to 800 $m^2/g$.

What is notable is that the person skilled in the art, on the basis of the known prior art, is given good reason to dispense with the use of carrier material, since the view is generally represented that this hinders the production of PU foam According to prior art, this is especially true of polyethyleneamines applied to silica.

Contrary to this general view, what matters in the present invention is specifically the presence of the carrier material, such as fumed silica or precipitated silica in particular.

The subject-matter of the invention enables the provision of polyurethanes, especially polyurethane foams, which have reduced aldehyde emissions and in which processibility is improved, particularly with regard to the values for compressibility—'force-to-crush' (FTC for short)—compared to the use of aldehyde scavengers from the prior art. More particularly, compressibility can be stabilized so well without additive by comparison with standard methods that the result is differences of less than 30%. Foam defects can be avoided.

"Polyamines P" in the context of this invention are preferably polyamines having a molecular weight of at least 100 g/mol and having at least 2 primary or secondary amino groups per molecule, especially a molecular weight of at least 200 g/mol and at least 3 primary or secondary amino groups per molecule.

When the poly amine P has a molar mass distribution, the molecular weight in the context of the present invention is in each case the number-average molecular weight. The number-average molecular weight can especially be obtained from GPC measurement with polystyrene calibration.

In a preferred embodiment, the polyamines P have a number-average molecular weight of at least 500 g/mol, preferably of at least 1000 g/mol, more preferably of at least 1500 g/mol, especially preferably of at least 2000 g/mol, in particular of at least 2500 g/mol. The upper limit for the number-average molecular weight is generally unlimited, but it should preferably not exceed 1 000 000 g/mol and more preferably not exceed 750 000 g/mol.

The polyamines P, in a preferred embodiment, have an amino functionality per molecule of at least 4, preferably of at least 5, more preferably of at least 6. The upper limit for the amino functionality is generally unlimited, but it should preferably not exceed 10.

Particularly preferred poly amines P in the context of this invention are compounds of the formula $H_2N—CH_2—CH_2—NH—(CH_2—CH_2—NH)_x—CH_2—CH_2—NH_2$ (I) with x=0 to 4, preferably 1 to 3, especially 1, and the reaction products thereof, especially the reaction products with guanidine salt. The reaction product is also referred to in the context of this invention as guanidine adduct and is a particularly preferred polyamine P.

Further preferred poly amines P in the context of this invention are the amines that are described as aldehyde scavengers in WO2016201615A1, preferably amines having at least one 1,3-propanediarnino function, such as, more particularly, N,N'-dimethylpropanediamine, N',N'-diphenyl-propanediarnine, 1-benzyl-1,3-propanediarnine, isotridecyloxypropyl-1,3-diaminopropane, dodecyloxypropyl-1,3-diarninopropane, and hexyloxypropyl-1,3-diaminopropane, the most preferred being isotridecyloxypropyl-1,3-diaminopropane. The use of these polyamines P corresponds to one particularly preferred embodiment within the meaning of the present invention.

Further preferred polyamines P in the context of this invention are the reaction products of an unsaturated nitrile and an aliphatic polyamine having at least two or more amine groups, preferably three or more amine groups, the unsaturated nitrile used being, in particular, 2-propenenitrile, and the aliphatic polyamine used being, in particular, diethylenetriamine, triethylenetetramine, tetraethylenepentamine, pentaethylenehexamine, hexaethyleneheptamine and/or hexamethylenediamine, particular preference being given to the reaction product of 2-propenenitrile with diethylenetriamine. The use of these polyarnines P corresponds to one 5 particularly preferred embodiment within the meaning of the present invention. According to the invention, the polyurethane systems are produced in the presence of a carrier material and of polyamine P. For the purposes of this invention, this means that the polyamine P, for example the guanidine adduct, is used together with the carrier material. More particularly, the polyamine P has been applied to the carrier material.

For the effect desired in accordance with the invention in the polyurethane foam, it is especially possible that
(i) being the polyamine P and the carrier material are added separately to the reaction mixture which serves to produce the polyurethane system, the carrier material preferably being been dispersed in a liquid,
(ii) the polyamine P and the carrier material are mixed with one another prior to the addition to the reaction mixture which serve to produce the polyurethane system In this case, the mixing according to (ii) can preferably be configured in such a way that the carrier material is dispersed in a liquid and this dispersion is mixed with the polyamine P (corresponding to iia).

In addition, the mixing according to (ii) can preferably be configured such that the carrier material in the form of a pulverulent solid is mixed directly with the poly amine P (corresponding to iib), such that there is preferably a dispersion with polyamine P as the continuous phase and carrier material as the dispersed phase.

The mixing according to (ii) also enables adsorption of the poly amine P onto the carrier material.

What is crucial for the invention is in any case the combined use of carrier material and poly amine P, i.e. the presence of carrier material and polyamine P in the production of the polyurethane system.

The subject-matter of the invention achieves the problem addressed by the invention. Thus, whenever a process for producing polyurethane systems is performed in the presence of carrier material and polyamine P, the provision of polyurethanes, especially polyurethane foams, having reduced aldehyde emissions is enabled, and which at the same time have improved processibility in the foam, by comparison with standard methods without additive. More particularly, the compression characteristics ('FTC') are only slightly adversely affected, preferably with a maximum difference of 30%. Foam defects are minimized.

The absolute amount of carrier material to be used based on the polyol system is especially between 0.001 and 5 wt %; the relative amount based on the polyamine P is especially between 0.1 and 10 wt %.

The carrier substances usable in accordance with the invention especially include synthetic silicas. These are generally distinguished by the production process therefor between fumed silicas, which are especially produced by the AEROSIL method by means of flame or high-temperature hydrolysis, or the precipitated silicas, which are especially synthesized by the wet method.

The AEROSIL method can essentially be described as a continuous flame hydrolysis of silicon tetrachloride ($SiCl_4$). In this case, $SiCl_4$ is converted to the gas phase and then reacts spontaneously and quantitatively within a hydrogen/oxygen gas flame with the hydrogen formed as an intermediate to form the desired silicon dioxide and HCl gas. By variation of the concentration of the coreactants (e.g. $SiHCl_3$, $H_3SiCl$ or else $AlCl_3$, $TiCl_4$, $ZrCl_4$, etc. as what are called pyrogenic special oxides), the flame temperature and the dwell time of the silicas in the combustion space, it is possible to influence the particle size, particle size distribution, specific surface area and surface characteristics of the silicas within wide ranges. A distinction should be made here that, by contrast with silicon dioxide which is fully amorphous, the special oxides $TiO_2$, $Al_2O_3$ etc., are obtained in crystalline form. An "amorphous" substance is one in which the atoms do not form any ordered structures, but form an irregular pattern, and have merely short-range order but no long-range order. The short dwell times in the hydrogen/oxygen gas flame virtually rule out sintering processes between the condensed phases. When the material has yet to leave the plant, it is particularly reactive in respect of a further treatment with a silane. For instance, the essentially hydrophilic starting silicas can be effectively and homogeneously functionalized by a chemical after-treatment in a continuous process such that they subsequently have hydrophobic surface properties. Functionalization of the Aerosil surface is accomplished with halosilanes, alkoxysilanes, silazanes and siloxanes. By virtue of this modification, the aftertreated silicas exhibit novel important performance properties.

Precipitated silicas in turn are produced from waterglass solutions, into which sulfuric acid is introduced under particular conditions. They are thus formed in aqueous phase. According to the precipitation conditions, products having smaller and somewhat greater primary particles can be produced, which then essentially determine the size of the specific surface area The precipitates thus obtained are washed out and dried by various methods (rotary drying, spray drying). The particle size of the agglomerated silica to be observed is preferably between 50 and 150 µm.

Depending on which drying method is employed, the silicas can or must subsequently be ground. While the particle size is very significantly reduced by the grinding, the size of the specific surface area is unaffected.

Silicas can be characterized particularly in terms of their specific surface area (according to BET Brunnauer, Emmett and Teller in accordance with DIN66131) and their primary particle size. Specifically in the case of Aerosils, it is difficult to specify particle sizes since the primary particles are generally aggregated and agglomerated to a greater or lesser degree.

More particularly, in the context of this invention, the polyarnines P used may be all those guanidine reaction products that are obtainable by reacting a guanidine salt with a polyamine, including in principle even polyarnines having a large molar mass, for example a molar mass >500 g/mol or >1000 g/mol or >2000 g/mol, etc.

The invention reliably minimizes the emission of aldehyde even in storage for a prolonged period. In effect, the severe increase observed in the level of acetaldehyde emission in storage on PEI use for example is curbed such that the level of acetaldehyde emission, if it is adversely affected at all, is not adversely affected to any significant degree, but at least not to the extent where there is such a severe increase in the acetaldehyde content of the polyurethane foam, for example by a factor of 50, as is the case on using the PEIs. So what is achieved is at the very minimum a distinct reduction in the rise of acetaldehyde emission in the course of storage. More particularly, even after a storage period of 5 months, the increase in the acetaldehyde content of the polyurethane foam is advantageously limited to not more than 2.5 fold as compared with a foam that has not been admixed with any additives to reduce formaldehyde emissions. This is a quite immense improvement over those prior art proposals that involve PEI use.

More particularly, the present invention safely limits the emission of formaldehyde from the already-produced polyurethane system (in particular polyurethane foam) to a value of advantageously not more than 0.02 mg of formaldehyde/kg PU system (PU foam), as may be determined with preference via VDA 275 (as per the modified procedure in the example part), even after a storage period of 5 months.

The process of the present invention accordingly makes possible the provision of polyurethane systems (in particular polyurethane foam) that deliver very good results not only with regard to aldehyde emissions but also with regard to processibility. Admixing the combination of carrier material and polyamine P of the present invention makes it possible to provide polyurethane systems (in particular polyurethane foams) where aldehyde emissions are reduced, where acetaldehyde emissions are scarcely affected adversely, if at all, and where preferably even comparatively unusual aldehydes such as, for example, benzaldehyde or acrolein can be absorbed.

A further advantage of the invention is that the resulting polyurethane systems have a biocidal effect, or a better biocidal effect than customary polyurethane systems. An additional advantage of the invention is that the process of the present invention makes the reactants react in an accelerated manner compared with processes wherein the combination of carrier material and polyamine P is not used.

The compounds used in the present invention, a process for their preparation, the use of compounds for producing the polyurethane systems/foams and also the polyurethane systems/foams themselves are hereinbelow described by way of example without any intention to limit the invention to these exemplary embodiments. When ranges, general formulae or compound classes are specified hereinafter, these shall include not just the corresponding ranges or groups of compounds that are explicitly mentioned but also all sub-ranges and sub-groups of compounds which can be obtained by removing individual values (ranges) or compounds. Wherever documents are cited within the context of the present description, then their contents, in particular as regards the substantive matter to which reference is made, are deemed as belonging in their entirety to the disclosure content of the present invention. Percentages are by weight, unless otherwise stated. Average values referred to hereinbelow are weight averages, unless otherwise stated. When properties of a material are referred to hereinbelow, for example viscosities or the like, the properties of the material at 25° C. are concerned, unless otherwise stated. When chemical (empirical) formulae are used in the present invention, the reported indices can be not only absolute numbers but also average values. Indices relating to polymeric compounds are preferably average values.

In the context of the invention, carrier material and poly amine P are used. Preferred poly amines P are reaction products of guanidine salts with a polyamine. Reacting the guanidine salts with the polyamine and particularly with the compounds of formula (I) may be carried out as described in the prior art. Guanidine reaction products are well known to a person skilled in the art. GB657753 describes two possible ways to synthesize guanidine reaction products and derivatives of guanidine salts, respectively. One way to obtain guanidine reaction products is by reacting an aminic compound, for example diethylenetriamine, with a guanidine salt, for example guanidine carbonate, to obtain the product in salt form Another way to arrive at this class of compound is to react amines with cyanamide or dicyandiamide and then treat the products with an organic or inorganic acid to convert them into the corresponding salts. The products resulting therefrom are also guanidine reaction products within the meaning of this invention. As described in EP2300418, the reaction can also be carried out directly in the presence of an acid, in which case the product is the corresponding salt of the alkylguanidine compound. Alternatively, salts of the amines can be converted into biguanidines by reaction of dicyanamide or sodium dicyanimide. A list of further suitable synthetic methods is found in Ullmann's Encyclopedia of Industrial Chemistry "Guanidine and Derivatives" and in a review by Katritzky et al. (Journal of Organic Chemistry, 2010, p. 76).

The guanidine reaction products which can preferably be used for the purposes of the present invention are obtainable in an advantageous manner by reacting a guanidine salt, in particular a guanidine-acid addition salt, with a polyamine at temperatures preferably between 90 150° C., a reaction time of preferably five to 36 hours, in which case the ammonia formed may optionally be removed from the reaction mixture using a vacuum pump. Since, as the reaction proceeds, there may be a substantial increase in the viscosity of the reaction mixture, it may be advantageous to use a suitable solvent. It is further possible to admix water to the product after the reaction has ended. Depending on the viscosity of the product, the admixture may take place at room temperature or at higher temperatures.

Reacting the guanidine salt with the polyamine, in particular a compound of formula (I), is carried out with a molar ratio of guanidine salts to the poly amine, in particular compounds of formula (I), which is in the range from 5:1 to 1:5, preferably from 1:1 to 1:3 and especially from 2:3 to 1:3. A particularly preferred molar ratio of guanidine salts: polyamine is 1:3 or 1:2 or 2:3.

Depending on the system into which the guanidine reaction products are later incorporated, there may be an advantage in reacting them at least partly with functionalizing reagents in a subsequent step, which is optional, in order that such properties as viscosity, solubility, polarity and miscibility may be made as system-adequate as possible. Useful functionalizing reagents include particularly any polymeric or monomeric chemistries with functional groups capable of entering a reaction with amino groups, examples being epoxides, acids, alkyl halides, dialkyl sulphates, etc. This procedure is known per se to a person skilled in the art who, if desired, is routinely able to effect an optional functionalization with the aid of a few hands-on tests. The notion of guanidine reaction products thus also comprehends functionalized guanidine reaction products.

The guanidine reaction products which can be used for the purposes of the present invention can also be admixed with a base, for example sodium ethoxide, to convert them into the corresponding basic guanidine derivative which, owing to its strong basicity, can function as catalyst to produce the PU system Again, guanidine reaction products which can be used for the purposes of the present invention are concerned here.

In principle, any known guanidine salts can be reacted in this invention, such as, preferably, guanidine hydrochloride, guanidine sulphamate, guanidine phosphate, guanidine acetate, guanidine carbonate, guanidine sulphate, guanidine thiocyanate or guanidine nitrate. Guanidine hydrochloride and/or guanidine carbonate in particular can be used as guanidine salt. Products arising in a similar manner from reacting biguanidines with a polyamine are also guanidine reaction products within the meaning of this invention.

In addition, as a person skilled in the art will know, for example from WO2008080184, it is possible for the original counter-ion of the derivatized guanidine salt (i.e. the original counter-ion of the guanidine reaction product) to be replaced by some other counter-ion by means of an ion exchanger.

Particularly preferred guanidine reaction products for use in the present invention are the compounds of formula (II)

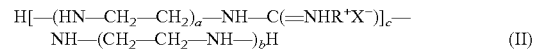
$$H[-(HN-CH_2-CH_2)_a-NH-C(=NHR^+X^-)]_c- NH-(CH_2-CH_2-NH-)_bH \quad (II)$$

which are obtainable by reacting a guanidine salt with a compound of formula (I), where
a=independently 0 to 6, advantageously 2 to 6, preferably 3 to 5, especially 3 or 4,
b=independently 0 to 6, advantageously 2 to 6, preferably 3 to 5, especially 3 or 4,
c=independently 1 to 4, preferably 1 or 2, preferably 1,
R=independently H or $(CH_2-CH_2-NH-)_dH$, in particular H,
d=independently 0 to 6, advantageously 2 to 6, preferably 3 to 5, in particular 3 or 4,
a and b may each be 0 when d>0 and R is not H, or d and b may each be 0 when a>0, or d and a may each be 0 when b>0,
$X^-$=anion, preferably a halide, particularly chloride.
$CO_3^{2-}$ may also function as anion.

In preferred compounds of formula (II), a=b in the compound of formula (II), with a=b=2 to 6, preferably 3 to 5, in particular 3 or 4, more preferably 3, and where preferably X– is=chloride and where preferably R is=H and where preferably c is=1 or 2. These compounds are obtainable in particular by reacting a guanidine salt with a poly amine of formula (I).

In a preferred embodiment of the process according to the present invention, therefore, the reacting is effected in the presence of a compound of formula (II)

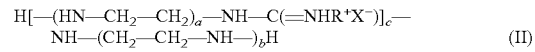
$$H[-(HN-CH_2-CH_2)_a-NH-C(=NHR^+X^-)]_c- NH-(CH_2-CH_2-NH-)_bH \quad (II)$$

which are obtainable by reacting a guanidine salt with a compound of formula (I), where
a=independently 0 to 6, advantageously 2 to 6, preferably 3 to 5, especially 3 or 4,
b=independently 0 to 6, advantageously 2 to 6, preferably 3 to 5, especially 3 or 4,
c=independently 1 to 4, preferably 1 or 2, preferably 1,
R=independently H or $(CH_2-CH_2-NH-)_dH$, in particular H,
d=independently 0 to 6, advantageously 2 to 6, preferably 3 to 5, in particular 3 or 4, a and b may each be 0 when d>0 and R is not H, or d and b may each be 0 when a>0, or d and a may each be 0 when b>0,
$X^-$=anion, preferably a halide, particularly chloride.

In preferred compounds of formula (II), a=b in the compound of formula (II), with a=b=2 to 6, preferably 3 to 5, in particular 3 or 4, more preferably 3, and where preferably X– is=chloride and where preferably R is=H and where preferably c is=1 or 2.

Formula (III) hereinbelow illustrates by way of example a compound of formula (II) where $X^-$ is=$Cl^-$, a=b=3, and c=2 and R is=H:

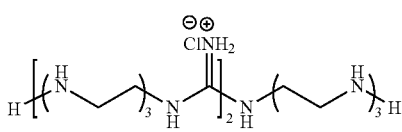

(III).

In a particularly preferred embodiment of the invention, the proportion of compounds of formula (II) where preferably a=b=2 to 6, in particular 3 or 4, in the process of the present invention, comprises not less than >40 wt % of the compounds obtainable by reacting a guanidine salt with a compound of formula (I). Preferably, the proportion therein of compounds of formula (II) where preferably a=b=2 to 6, in particular 3 or 4, comprises from 60 to 80 wt %, especially from 90 to 98 wt % based on the compounds obtainable by reacting a guanidine salt with a compound of formula (I).

In one preferred embodiment of the invention, not only the guanidine reaction product is added but additionally also at least one aliphatic polyamine, preferably with a molar mass below 400, advantageously below 300 and especially 250 g/mol, advantageously comprising at least two or more amino groups, e.g. diethylenetriamine, triethylenetetramine, tetraethylenepentamine, pentaethylenehexamine, hexaethyleneheptamine, hexamethylenediamine, 1,8-diaminotriethylene glycol, tris(2-aminoethyl)amine. The aliphatic polyamine which may optionally be used in addition may be used, for example, in an amount of 0.001 to 10 wt %, preferably 0.01 to 5 wt %, especially 0.05 to 3 wt % based on the polyol component. This should be understood as an additional amount which does not count toward the poly amine P.

The guanidine reaction products, which may in accordance with the invention be a preferred polyamine P, for the purposes of this invention may also be formed in situ, i.e. the guanidine reaction products are only formed in the course of the reaction of the polyol component with at least one isocyanate component in the context of producing the polyurethane system from the suitable reactants, which in particular comprise guanidine salt and polyamine. In other words, therefore, the process of the present invention also comprises the possibility that the guanidine reaction product, which in accordance with the invention is a preferred polyamine P, is only formed in the reaction mixture for producing the polyurethane system This corresponds to a preferred embodiment of the invention. It is more preferable, however, to use the ready-synthesized guanidine reaction product to produce the polyurethane system.

The production of polyurethane systems may otherwise take place in the customary manner and as described in the prior art. It is well known to a person skilled in the art. A comprehensive overview is found in, for example, G. Oertel, Polyurethane Handbook, 2nd edition, Hanser/Gardner Publications Inc., Cincinnati, Ohio, 1994, p. 177-247. In the process of producing the polyurethane systems in the manner of the present invention, the polyamines P, preferably guanidine reaction products are preferably used in a mass fraction of 0.01 to 20 parts, preferably of 0.05 to 5 parts and especially of 0.1 to 3 parts based on 100 parts of polyol component.

It may be advantageous to conduct the process of producing the polyurethane systems in the manner of the present invention to additionally admix water, physical blowing agents, flame retardants and/or further additives.

Any isocyanate may be used as isocyanate component in the process of the present invention, especially the aliphatic, cycloaliphatic, araliphatic and preferably aromatic polyfunctional isocyanates known per se. Suitable isocyanates for the purposes of this invention include for example any polyfunctional organic isocyanates, for example 4,4'-diphenylmethane diisocyanate (MDI), toluene diisocyanate (TDI), hexamethylene diisocyanate (HMDI) and isophorone diisocyanate (IPDI). The mixture of MDI and more highly condensed analogues having an average functionality of 2 to 4 which is known as crude MDI ("polymeric MDI") is particularly suitable, as well as each of the various isomers of TDI in pure form or as isomeric mixture. Mixtures of TDI and MDI are particularly preferred isocyanates.

All organic substances having two or more isocyanate-reactive groups, and also preparations thereof, are preferably suitable polyols as polyol components for the purposes of this invention. All polyether polyols and polyester polyols typically used for production of polyurethane systems, especially polyurethane foams, are preferred polyols. The polyols are preferably not compounds having one or more than one 5- or 6-membered ring constructed of one or two oxygen atoms and carbon atoms.

Polyether polyols may be obtained by reacting polyfunctional alcohols or amines with alkylene oxides. Polyester polyols are preferably based on esters of poly basic carboxylic acids (which may be either aliphatic, as in the case of adipic acid for example, or aromatic, as in the case of phthalic acid or terephthalic acid, for example) with polyhydric alcohols (usually glycols). Natural oil based polyols (NOPs) can also be used. These polyols are obtained from natural oils such as soya or palm oil for example and can be used in the modified or unmodified state.

A further class of polyols are those which are obtained as prepolymers via reaction of polyol with isocyanate in a molar ratio of 100:1 to 5:1, preferably 50:1 to 10:1.

A still further class of polyols which can be used with preference is that of the so-called filled polyols (polymer polyols). These contain dispersed solid organic fillers up to a solids content of 40 wt % or more. The following are among those which may be used for example:

SAN polyols: These are highly reactive polyols containing a dispersed copolymer based on styrene-acrylonitrile (SAN).

PHD polyols: These are highly reactive polyols containing polyurea, likewise in dispersed form.

PIPA polyols: These are highly reactive polyols containing a dispersed polyurethane, for example formed by in situ reaction of an isocyanate with an alkanolamine in a conventional polyol.

The solids content, which is preferably between 5 and <40 wt %, based on the polyol, depending on the application, is responsible for improved cell opening, and so the polyol can be formed in a controlled fashion, in particular with TDI, and no shrinkage of the foams occurs. The solid thus acts as an essential processing aid. A further function is to control the hardness via the solids content, since higher solids contents bring about a higher hardness on the part of the foam.

The formulations with solids-containing polyols are distinctly less self-stable and therefore tend to require physical stabilization in addition to the chemical stabilization due to the crosslinking reaction.

Depending on the solids contents of the polyols, these are used either alone or in a blend with the abovementioned unfilled polyols.

An isocyanate component:polyol component ratio which is preferred for the purposes of this invention is expressed as the index and is in the range from 10 to 1000, preferably from 40 to 350.

This index describes the ratio of isocyanate actually used to the isocyanate computed for a stoichiometric reaction with polyol. An index of 100 represents a molar ratio of 1:1 for the reactive groups.

Suitable catalysts for possible use in the process of the present invention are preferably substances to catalyse the gel reaction (isocyanate-polyol), the blowing reaction (isocyanate-water) or the di- or trimerization of the isocyanate. Typical examples are amines, e.g. triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, tris(dimethylaminopropyl)hexahydro-1,3,5-triazine, N-ethylmorpholine, dimethylaminoethanol, dimethylaminoethoxyethanol and bis(dimethylaminoethyl) ether, tin salts of organic carboxylic acids, tin compounds such as dibutyltin dilaurate and potassium salts such as potassium acetate. It is preferable for further catalysts used to contain no organotin compounds, especially no dibutyltin dilaurate.

The amounts in which these catalysts are suitably used in the process of the present invention depend on the type of catalyst and typically range from 0.01 to 5 pphp (=parts by weight based on 100 parts by weight of polyol) or from 0.1 to 10 pphp in the case of potassium salts.

The amount of water suitably present in the process of the present invention depends on whether or not physical blowing agents are used in addition to water. In the case of purely water-blown foams, the water contents typically range preferably from 1 to 20 pphp; when other blowing agents are used in addition, the amount of water used typically decreases to 0 or to the range from 0.1 to 5 pphp for example. To achieve high foam densities, neither water nor any other blowing agent is preferably used.

Suitable physical blowing agents for the purposes of this invention are gases, for example liquefied $CO_2$, and volatile liquids, for example hydrocarbons of 4 or 5 carbon atoms, preferably cyclo-, iso- and n-pentane, hydrofluorocarbons, preferably HFC 245fa, HFC 134a and HFC 365mfc, but also olefinic hydrofluorocarbons such as HHO 1233xa or HHO336mzzZ, hydrochlorofluorocarbons, preferably HCFC 141b, oxygen-containing compounds such as methyl formate and dimethoxymethane, or hydrochlorocarbons, preferably dichloromethane and 1,2-dichloroethane. Suitable blowing agents further include ketones (e.g. acetone) or aldehydes (e.g. methylal).

Stabilizers used may be the substances mentioned in the prior art. The compositions of the present invention may advantageously contain one or more stabilizers. They are in particular silicon compounds comprising carbon atoms and preferably selected from polysiloxanes, polydimethylsiloxanes, organomodified polysiloxanes, polyether-modified polysiloxanes and polyether-polysiloxane copolymers.

Useful silicon compounds comprising one or more carbon atoms include the substances mentioned in the prior art. Preference is given to using such silicon compounds as are particularly suitable for the particular type of foam Suitable siloxanes are described for example in the following references: EP 0839852, EP 1544235, DE 102004001408, WO 2005/118668, US 2007/0072951, DE2533074, EP 1537159, EP 533202, U.S. Pat. No. 3,933,695, EP 0780414, DE 4239054, DE 4229402, EP 867465. The silicon compounds may be obtained as described in the prior art. Suitable examples are described for instance in U.S. Pat. No. 4,147,847, EP 0493836 and U.S. Pat. No. 4,855,379.

Organomodified silicon compounds can be used in particular. Useful organomodified silicon compounds which are particularly preferred include, for example, those conforming to the following formula (IV):

$$M_k D_m D'_n T_o Q_p \quad (IV)$$

where
$M=[R^2R^1{}_2SiO_{1/2}]$
$D=[R^1R^1SiO_{2/2}]$
$D'=[R^3R^1SiO_{2/2}]$
$T=[R^1SiO_{3/2}]$
$Q=[SiO_{4/2}]$,
k=0 to 22, preferably 2 to 10, more preferably 2,
m=0 to 400, preferably 0 to 200, more preferably 2 to 100
n=0 to 50, preferably 0.5 to 20, more preferably 0.7 to 9
o=0 to 10, preferably 0 to 5, especially 0
p=0 to 10, preferably 0 to 5, especially 0
$R^2=R^1$ or $R^3$
$R^1$=independently alkyl or aryl radicals or H, preferably methyl, ethyl, propyl or phenyl, more preferably methyl or phenyl
$R^3$=organic modifications e.g. polyethers or a monovalent moiety of 1 to 30 carbon atoms with at least one heteroatom selected from the group N, S, O, P, F, Cl, Br
The $R^3$ in formula (IV) are preferably moieties from the group —$CH_2CH_2CH_2O[CH_2CH_2O]_a[CH_2CH(CH_3)O]_b$
[$CHR^4CHR^4O]_cR^5$

—$CH_2CH_2CH_2CN$

—$CH_2CH_2CF_3$

—$CH_2CH_2CH_2Cl$ where
$R^5$=alkyl, aryl, urethane, carboxyl, silyl or H, preferably H, -Me, or —C(O)Me
$R^4$=alkyl, aryl, which may each be optionally interrupted by oxygen, more preferably H, Me, Et or Ph,
a=0 to 100, preferably 0.5 to 70, more preferably 1-40
b=0 to 100, preferably 0.5 to 70, more preferably 0-40
c=0 to 50, preferably 0 to 15, especially 0
a+b+c>3.
Unmodified silicon compounds can be used in particular. Useful unmodified silicon compounds which are particularly preferred include, for example, those conforming to the following formula (V):

$$M_q D_r \quad (V)$$

where
M and D as defined for above formula (IV), and
q=2
r=0 to 50, preferably 1 to 40, more preferably 2 to 30.
The abovementioned silicon compounds, especially of formula (IV) and/or (V), may with particular preference be used individually or combined with one another. A compatibilizer may additionally be used in the case of mixtures. This compatibilizer may be selected from the group of aliphatic or aromatic hydrocarbons, more preferably aliphatic polyethers or polyesters.

It may be advantageous for at least 10% by equivalence (and at most 50% by equivalence) of the $R^2$ moieties in the siloxane compounds of formula (IV) to be alkyl groups of 8 to 22 carbon atoms (based on the overall number of R2 moieties in the siloxane compound).

From 0.05 to 10 parts by mass of silicon compounds may preferably be used per 100 parts by mass of polyol components.

It is especially when the aforementioned silicon compounds are used in combination with the reaction products to be used according to the present invention that very good results are made possible with regard to the polyurethanes sought according to the present invention.

In addition to or in lieu of water and any physical blowing agents, the additive composition of the present invention may also include other chemical blowing agents that react with isocyanates by evolving a gas, examples being formic acid, carbamates and carbonates.

Suitable flame retardants for the purposes of this invention are preferably liquid organophosphorus compounds, such as halogen-free organic phosphates, e.g. triethyl phosphate (TEP), halogenated phosphates, e.g. tris(1-chloro-2-propyl) phosphate (TCPP) and tris(2-chloroethyl) phosphate (TCEP), and organic phosphonates, e.g. dimethyl methanephosphonate (DMMP), dimethyl propanephosphonate (DMPP), or solids such as ammonium polyphosphate (APP) and red phosphorus. Suitable flame retardants further include halogenated compounds, for example halogenated polyols, and also solids such as melamine and expandable graphite.

The process of the present invention provides polyurethane systems, in particular polyurethane foams, that are particularly low-emission with regard to aldehyde with good processibility.

The term polyurethane within the meaning of the present invention is to be understood as a generic term for any polymer obtained from di- or polyisocyanates and polyols or other isocyanate-reactive species, such as amines for example, in that the urethane bond need not be the only or predominant type of bond. Polyisocyanurates and polyureas are also expressly included.

The production of polyurethane systems in the manner of the present invention, in particular the production of polyurethane foams in the manner of the present invention and/or the production of polyurethane systems/polyurethane foams may be effected by any process known to a person skilled in the art, for example by hand mixing or preferably using high-pressure or low-pressure foaming machines. The process of the present invention can be carried out as a continuous operation or as a batch operation. Batch operation is preferable for the process to produce molded foams, refrigerators, shoe soles or panels. A continuous process is preferable to produce insulation panels, metal composite elements, slabs or for spraying techniques.

In the process of the present invention, the combinations of polyamine P, in particular guanidine adduct, and carrier material used in the present invention can preferably be admixed directly before or, alternatively, during the reaction to form the urethane bonds. The combination is preferably admixed in a mixing head, and also in a batch process for ready-produced polyol systems. According to the preferred embodiment, the polyamine P, in particular guanidine adduct, can be dispersed directly with the silica or the polyamine P, in particular guanidine adduct, and the silica, preferably dispersed in a solvent, can be added to the polyol component separately from one another.

The polyurethane systems of the present invention may preferably include from 0.001 to 10 wt %, may advantageously include from 0.01 to 5 wt % and may especially include from 0.1 to 3 wt %, of a total amount of carrier material and polyamine P, based on the overall composition of the polyurethane system.

The polyurethane systems of the present invention may preferably be a polyurethane foam, especially, for example, a rigid polyurethane foam, a flexible polyurethane foam, a viscoelastic foam, an HR foam, a semi-rigid polyurethane foam, a thermoformable polyurethane foam or an integral foam, preferably an HR polyurethane foam.

The polyurethane systems, preferably polyurethane foams, of the present invention can be used for example as refrigerator insulation, insulation panel, sandwich element, pipe insulation, spray foam, 1- and 1.5-component can foam (a 1.5-component can foam is a foam that is produced by destroying a container in the can), wood imitation, modelling foam, packaging foam, mattress, furniture cushioning, automotive seat cushioning, headrest, dashboard, automotive interior, automotive roof liner, sound absorption material, steering wheel, shoe sole, carpet backing foam, filter foam, sealing foam, sealant and adhesive, binder or coating for producing corresponding products.

The invention further provides a composition for production of polyurethane foam, comprising at least one urethane and/or isocyanurate catalyst, at least one blowing agent, at least one isocyanate component and at least one polyol component, wherein an additive present comprises carrier material and polyamine P, preferably one or more supported compounds comprising polyamine P, preferably obtained by reaction of a guanidine salt with a polyamine, especially a compound of the formula $H_2N$—$CH_2$—$CH_2$—$NH$—($CH_2$—$CH_2$—$NH)_x$—$CH_2$—$CH_2$—$NH_2$ with x=0 to 4, preferably 1 to 3, especially 1. More particularly, reference is made to the statements already made in order to avoid repetition.

The notion of composition in this sense also comprehends multicomponent compositions wherein two or more components have to be mixed to produce a chemical reaction leading to polyurethane foam production. The notion of composition in this sense comprehends in particular the mix (mixture) of at least one urethane and/or isocyanurate catalyst, at least one blowing agent, at least one isocyanate component and at least one polyol component and also carrier material and poly amine P, in particular a guanidine reaction product.

A preferred polyurethane foam production composition according to the present invention may contain polyol, for example in amounts of 25 to 75 wt %, water, for example in amounts of 1 to 7 wt %, catalyst, for example in amounts of 0.05 to 3 wt %, physical blowing agent, for example in amounts of 0 to 25 wt % (e.g. 0.1 to 25 wt %), stabilizers (such as, for example, silicon-containing and non-silicon-containing, in particular silicon-containing and non-silicon-containing organic stabilizers and surfactants), for example in amounts of 0.3 to 5 wt %, isocyanate, for example in amounts of 20 to 50 wt %, and the carrier material and polyamine P, in particular guanidine reaction product, to be used according to the present invention, for example in amounts of 0.00001 to 5 wt % (preferably 0.00005 to 2.5 wt %).

As regards preferred embodiments of these aforementioned compositions, the preceding description is referenced particularly with respect to the carrier material and polyamine P, in particular the guanidine reaction product.

The invention further provides a process for reducing aldehyde total emission, preferably emissions comprising formaldehyde, acetaldehyde, acrolein, and also aromatic aldehydes, such as benzaldehyde, advantageously aldehyde emissions comprising formaldehyde, acetaldehyde, acrolein and benzaldehyde, in particular aldehyde emissions comprising formaldehyde and acetaldehyde, from polyurethane systems (in particular polyurethane foams) by admixture to the polyurethane system (in particular the polyurethane foam) of carrier material and polyamine P, in particular guanidine reaction products, as recited above, preferably in an amount of 0.001 to 10 wt %, advantageously 0.01 to 5 wt %, especially 0.1 to 3 wt %, based on the overall weight of the polyurethane system (in particular of the polyurethane foam), wherein the admixture may take place before and/or during the production of the polyurethane system (especially of the polyurethane foam).

The present invention further provides a polyurethane system (in particular a polyurethane foam) containing carrier material and polyamine P, in particular guanidine reaction products, as described above, in an amount of preferably 0.001 to 10 wt %, advantageously 0.01 to 5 wt %, especially 0.1 to 3 wt % based on the overall weight of the polyurethane system (in particular of the polyurethane foam), obtainable in particular by admixing carrier material and polyamine P before and/or during the production of the polyurethane system, in particular of the polyurethane foam.

The invention further provides for the use of carrier material and polyamine P, in particular guanidine reaction products, as described above, for production of polyurethane foams that are low-emission with regard to aldehydes, preferably comprising formaldehyde, acetaldehyde, acrolein and benzaldehyde, in particular low-emission with regard to formaldehyde and acetaldehyde.

The examples listed below describe the present invention by way of example, without any intention of restricting the invention, the scope of application of which is apparent from the entirety of the description and the claims, to the embodiments specified in the examples.

EXAMPLES

TABLE 1

Raw materials for producing the foam moldings

| | |
|---|---|
| polyol A | trifunctional polyetherol, MW 6000, Covestro AG |
| polyol B | trifunctional polyetherol, MW 4500, Dow Chemicals |
| crosslinker | Tegoamine DEOA 85 (diethanolamine 85% in water), Evonik Industries AG |
| catalyst 1 | Tegoamine ZE1 (1,1'-{[3-(dimethylamino)propyl]imino} bispropan-2-ol), Evonik Industries AG |
| catalyst 2 | Tegoamine DMEA (N,N-dimethylethanolamine), Evonik Industries AG |
| catalyst 3 | DABCO ® NE300 (N-[2-[2-( dimethylamino)ethoxy]ethyl]-N-methyl-1,3-propane-diamine) |
| silicone stabilizer | Tegostab B 8734 LF 2, Evonik Industries AG |
| isocyanate | methylene diisocyanate, Suprasec 2447, NCO = 32.6%, Huntsman |

TABLE 2

Additives used

| Additive | Description |
|---|---|
| additive 1 | ORTEGOL LA: (reaction product of triethylenetetramine with guanidine hydrochloride), 30% aqueous solution |
| additive 2 | ORTEGOL COM (silica dispersion 20 wt % hydrophobized Aerosil in glycol (2-(2-butoxyethoxy)ethanol)) |
| additive 3 | 3 mixture of ORTEGOL LA and ORTEGOL COM 50:50 |
| additive 4 | mixture of ORTEGOL LA and ORTEGOL COM 74:26 |
| additive 5 | silica dispersion 7 wt % Aerosil with ORTEGOL LA as 30% aqueous solution |

Production of Silica Dispersions:

To produce silica dispersions, the phase to be dispersed (silica) the dispersant (e.g. glycol) are initially charged in a vessel (e.g. stainless steel beaker) and dispersed with a dissolver disc (d=6 cm) at 5000 rpm for 30 min. The use of a vacuum Dispermat counteracts possible foam formation that can be caused by ingress of air during the dispersing operation.

Production of HR Polyurethane Foams by Means of a High-Pressure Foaming Machine

Foaming operations were performed by means of a Henneke HK 270 high-pressure foaming machine equipped with an MQ mixing head. To simulate a cold foam system of particular practical relevance, the raw materials specified in Tables 1 and 2 were used. The amounts of the respective reactants used can be found in Tables 3 and 4.

The reaction mixture was introduced into a box mold heated to 55° C. (dimensions 40×40×10 cm), which was treated beforehand with a separating agent (Gorapur LK 8931-6 HW), by means of the mixing head, and the mold was then closed. The :finished foam was demolded after 4 min. For better demolding, a wax-based separating agent was applied to the mold by means of a spray gun.

The foaming machine was operated with the following parameters:

Polyol output corresponding to the sum total of all components in the polyol formulation (see, for example, Table 3, foam V1 107.2 g) 107.2 g/s, isocyanate output (at index 75): 45.7 g/s Dosage time: 6 s Mixing pressure: polyol component 150 bar, isocyanate 160 bar Raw material temperatures in the tank: polyol 25° C., isocyanate 26° C.

Straight after demolding, the foams were subjected to the standard force-to-crush test.

Force-to-Crush Measurements

Force-to-crush measurements are a general way of examining the open cell content of the foam In the production of automobile seat cushions, the open cell content of the foams is an important parameter in order to assure the dimensional stability of a molding and to prevent shrinkage after production.

The measurement was conducted as follows:

Immediately after the demolding of a foam pad (<15 seconds thereafter), the pad is introduced into the starting position of the FTC machine, where the measurement foot/measurement plate/measurement probe is at a distance of 115 mm from the base plate and is in contact with the foam and moves at 500 mm/min. The initial foam thickness is measured when the force reaches 5 N. Without stopping at 5 N, the measurement foot penetrates further into the foam at 500 mm/min until a distance of 50 mm from the base plate is attained. At this point, FTC 1 is taken. There is no interruption in the measurement. The measurement foot returns at 500 mm/min to its starting position (115 mm from the base plate) and thus ends the first cycle. 9 further cycles identical to the first cycle are completed without delay. After the 10th cycle, the measurement foot stops in the starting position. The foam pad is then fully compressed by hand and then put back into the machine. A further cycle (the 11th) is conducted under the same conditions as in the first 10. The foam thickness at the end is then measured in the same way as the foam thickness at the start of the first cycle. The foam thickness at the start is assessed after FTC1, the remaining closed-cell content is described by the difference FTC10-FTC 11, and the compressibility of the foam is read off from the shape of the curve (how quickly FTC drops). FTC11 (hardness of the fresh foam) can be used as a measure of the foam curing.

Instrument Parameters of the Testing Machine:
  H10K-S universal tester
  Manufacturer: Tinius Olsen
  Manufacturer number: 672
  Maximum measurement: 10 kN Measurement of the Indentation Hardness (ILD—Indentation Load Defection, Hardness at 40% Compression) According to DIN EN ISO 2439:2009-05:

The indentation hardness of elastomeric foams is a measure of the stress properties thereof. This abovementioned international standard defines four methods (A to D) of determining the indentation hardness and one method (E) of determining the compression set coefficient and the hysteresis loss of elastomeric foams. In this case, method A is used, which is defined as follows:

Method A—Determination of the indentation hardness index (40%/30 s) which gives an individual measurement of the indentation for laboratory tests.

The force required to achieve a prescribed indentation under the above-described conditions is measured. The measurements can be conducted on the same machine which was used for the FTC measurements (see above).

The material must not be tested less than 72 h after production. However, a reduced maturation time of 16 h or 48 h is permissible if it can be demonstrated that the average results at these times differ by less than ±10% from the 72 h values. Testing after either 16 h or 48 hat the fixed time is permissible when the abovementioned criteria have been fulfilled.

Before the test, the test specimens have to be conditioned without stress and tension for at least 16 h in one of the following sets of climatic conditions as described in ISO 23529:
  (23±2) ° C., (50±5) % relative air humidity; or
  (27±2) ° C., (65±5) % relative air humidity.

This conditioning period may form the concluding part of the wait period after the production. In the case of quality control, test specimens may already be taken 12 h or later after production, and the testing may be conducted after conditioning for at least 6 h in one of the sets of fixed climatic conditions.

The test specimen is placed onto the contact plate in such a way that the centre of the test specimen or a test region, if appropriate, lies beneath the centre of the indentation ram. If the test specimen has cavities on one side, the side with the cavities should face the contact plate.

a) A force of 5 N should be applied in the test region selected and then the thickness of the test specimen should be measured. This value serves as the point with an indentation of zero.
b) The test specimen should then be subjected to an indentation advance rate of (100±20) mm/min up to an indentation of (70±2.5) % of the thickness. On attainment of this deformation, the load is removed at the same speed.
c) This cycle of loading and load relief should be repeated twice more.

Determination of the Indentation Hardness Index (40%/30 s)

Immediately after the load has been removed for the third time, the test specimen should be compressed by (40±1) % of its thickness.

This indentation should be maintained for a period of time of (30±1) s. The force in newtons should be measured at the end of this period of time and then the load should be removed from the test specimen.

The molded foams produced by the method described above were also analyzed in line with VDA 275 (VDA 275 "Moldings for the Automotive Interior-Determination of Formaldehyde Evolution." Measurement by the modified bottle method; source: VDA275, 07/1994, www.vda.de) for their formaldehyde and acetaldehyde content.

Principle of Measurement

Test specimens having a certain mass and size were secured above distilled water in a closed 1 L glass bottle and stored for a defined period at constant temperature in the method. The bottles were subsequently cooled down and the absorbed formaldehyde and acetaldehyde was determined in the distilled water. The amount of formaldehyde and acetaldehyde determined was divided by the dry weight of the molding (mg/kg).

Analysis

Test Specimen: Sample Preparation, Sample Taking and Sample Dimensions

After demolding, the foams were stored at 21° C. and about 50% relative humidity for 24 hours. Samples of the molding were then taken at suitable and representative spots distributed uniformly across the width of the (cooled) molding. The foams were then wrapped in aluminium foil and sealed in a polyethylene bag.

The samples were each 100×40×40 mm in size (about 9 g). Per molding, 3 samples were taken for the aldehyde test.

Test Procedure: Formaldehyde/Acetaldehyde Release

The sealed samples were subjected to direct determination immediately upon being received. The samples were weighed on an analytical balance to an accuracy of 0.001 g before analysis. A 50 ml quantity of distilled water was pipetted into each of the glass bottles used. The samples were introduced into the glass bottle, and the vessel was sealed and kept at a constant temperature of 60° C. in a thermal cabinet for 3 hours. The vessels were removed from the thermal cabinet after the test period. After standing at room temperature for 60 minutes, the samples were removed from the test bottle. This was followed by derivatization by the DNPH method (dinitrophenylhydrazine). For this, 900 µl of the aqueous phase were admixed with 100 µl of a DNPH solution. The DNPH solution was prepared as follows: 50 mg of DNPH in 40 mL of MeCN (acetonitrile) are acidulated with 250 µL of dilute HCl (1:10) and made up to 50 mL with MeCN. After the derivatization has been carried out, a sample is analyzed using HPLC. Separation into the individual aldehyde homologues is effected.

HPLC Apparatus Parameters

The following apparatus was used for the analysis:
  Agilent Technologies 1260
  Chromatography column: Phenomenex Luna 250*4.6 mm C18, 5µ particle size
  Mobile phase: water acetonitrile gradient
  Detection: UV 365 nm

TABLE 3

Formulation for producing the moldings and results of hardness and formaldehyde measurements

|  | V 1 | V 2 | EM 1 | EM 2 | EM 3 | EM 4 |
|---|---|---|---|---|---|---|
| polyol A | 100 | 100 | 100 | 100 | 100 | 100 |
| polyol B | 1 | 1 | 1 | 1 | 1 | 1 |
| crosslinker | 0.7 | 0.7 | 0.7 | 0.7 | 0.7 | 0.7 |
| water | 3.6 | 3.3 | 3.3 | 3.3 | 3.3 | 3.3 |
| catalyst 1 | 0.6 | 0.6 | 0.6 | 0.6 | 0.6 | 0.6 |

TABLE 3-continued

Formulation for producing the moldings and
results of hardness and formaldehyde measurements

|  | V 1 | V 2 | EM 1 | EM 2 | EM 3 | EM 4 |
|---|---|---|---|---|---|---|
| catalyst 2 | 0.3 | 0.3 | 0.3 | 0.3 | 0.3 | 0.3 |
| silicone stabilizer | 1 | 1 | 1 | 1 |  |  |
| additive 1 | 0 | 1 | 1 |  |  |  |
| additive 2 |  |  | 1 |  |  |  |
| additive 3 |  |  |  | 2 |  |  |
| additive 4 |  |  |  |  | 1.35 |  |
| additive 5 |  |  |  |  |  | 1.08 |
| isocyanate, index 75 | 45.7 | 45.7 | 45.7 | 45.7 | 45.7 | 45.7 |
| cells per cm | 14 | 12 | 12 | 12 | 12 | 12 |
| ILD hardness 40%, N | 148 | 135 | 148 | 141 | 140 | 142 |
| FTC 1 | 1934 | 1559 | 1804 | 1826 | 1789 | 1810 |
| FTC 10 | 208 | 135 | 185 | 189 | 193 | 190 |
| FTC 11 | 184 | 151 | 179 | 173 | 175 | 182 |
| formaldehyde emissions ppm (VDA 275, mod.) | 0.65 | 0.24 | 0.09 | 0.07 | 0.10 | 0.11 |
| blank value of formaldehyde, ppm | 0.02 | 0.02 | 0.02 | 0.02 | 0.02 | 0.02 |
| proportion of Aerosil carrier, % |  |  | 20% carrier | 20% carrier | 7% carrier | 7% carrier |

The amounts of the raw materials are in grams.

The foam results show that, with addition of additive 1 compared to the zero foam without additive (V1), a positive change in the formaldehyde emissions (V2) is already achieved, but there is additionally also a great deterioration in the closed-cell content (FTC), and also in the ILD hardness. The difference in the FTC 1 values from V1 to V2 is nearly 200%, which can be assessed as a significant drop in the closed-cell content and hence has a major effect on the processibility of the formulation.

If additive 2 (EMI) is now added in addition to additive 1 (separate addition), a positive effect is found in the form of a distinct reduction in the formaldehyde emission that occurs, which is close to the detection limit. Moreover, the closed-cell content (FTC 1-10, 11) and the ILD hardness can be raised almost to the starting value. The same result is achieved when additive 1 and 2 are already mixed beforehand in the same mixing ratio and then added (EM2).

Example EM3 is the same mixture as EM2, but with a lower proportion of carrier substance. The improvement in the properties to be observed here is within the same order of magnitude.

Example EM4 as a dispersion of the Aerosil directly in the guanidinium reaction product (without additional dispersant, since the guanidinium reaction product here functions as such) likewise gives comparably good results.

The foam results show that, by virtue of the inventive addition of the carrier material and the polyamine P, it is possible to produce PU foams with reduced formaldehyde emissions, in which the ILD hardness and the processibility, reflected by the closed-cell content (FTC), can be kept virtually at the starting level.

TABLE 4

Formulation for producing the moldings and results of
hardness and formaldehyde measurements

|  | V 3 | V 4 | EM 5 |
|---|---|---|---|
| polyol A | 100 | 100 | 100 |
| polyol B | 1.3 | 1.3 | 1.3 |
| crosslinker | 0.7 | 0.7 | 0.7 |
| water | 3.4 | 3.4 | 3.4 |
| catalyst 3 | 0.2 | 0.2 | 0.2 |
| catalyst 2 | 0.8 | 0.8 | 0.8 |
| silicone stabilizer | 1 | 1 | 1 |
| Additive A (ORTEGOL LA 2: Reaction product of 2-propenenitrile with diethylenetriamine) |  | 0.4 |  |
| additive B (silicic acid dispersion 7 wt % Aerosil with ORTEGOL LA 2) |  |  | 0.43 |
| isocyanate, index 95 | 55.8 | 55.8 | 55.8 |
| cells per cm | 12 | 7 | 12 |
| ILD hardness 40%, N | 322 | 198 | 307 |
| FTC 1 | 402 | 265 | 344 |
| FTC 10 | 391 | 265 | 350 |
| FTC 11 | 326 | 213 | 289 |
| formaldehyde emissions ppm (VDA275, mod.) | 0.86 | 0.07 | 0.08 |
| blank value of formaldehyde, ppm | 0.02 | 0.02 | 0.02 |
| proportion of Aerosil carrier, % | 0 | 0 | 7 |

The amounts of the raw materials are in grams.

The foam results show that, with addition of additive A compared to the zero foam without additive (V3), a positive change in the formaldehyde emissions (V 4) is already achieved, but there is additionally a great deterioration in the closed-cell content (FTC), thus in this case is lower, and also in the ILD hardness. The difference in the FTC 1 values from V3 to V 4 is even over 30% here, which can be assessed as a significant drop in the closed-cell content and hence has a major effect on the processibility of the formulation.

If, instead of additive A, additive B according to the invention (EMS) is now added (already completely dispersed variant), the positive effect is furthermore found in the form of reduced formaldehyde emission, but here particularly an improved closed-cell content (FTC 1-10, 11), and the ILD hardness which returns almost to the starting value.

The foam results show that, by virtue of the inventive addition of the carrier material and the polyamine P, it is possible to produce PU foams with reduced formaldehyde emissions, in which the ILD hardness and the processibility, reflected by the closed-cell content (FTC), can be kept virtually at the starting level.

The invention claimed is:

1. A process for production of polyurethane systems, comprising;
   reacting a reaction mixture comprising 25-75 wt. % of a polyol component comprising a polyetherol, and optionally water; an isocyanate component;
   one or more catalysts for reaction of the isocyanate component and the polyetherol, for reaction of the isocyanate component and water, and/or
   trimerization of the isocyanate component,
   a carrier material; and
   a polyamine P
   wherein wt. % is based on a weight of said reaction mixture and
   said reacting is carried out in the presence of a mass fraction of in total from 0.01 to 10 parts by weight of said carrier material and said polyamine P based on 100 parts by weight of the polyol component and wherein a relative amount of carrier material based on an amount of polyamine P is 0.1 to 10 wt. %, wherein the polyamine P results from the reaction of a guanidine salt with a polyamine of formula (I)

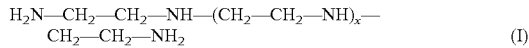   (I)

where x=1, and
wherein said carrier material used is a hydrophobized silica.

2. The process according to claim 1,
wherein said reaction of the guanidine salt with the polyamine of formula (I) is carried out with a molar ratio of guanidine salt to the polyamine of formula (I), which is in the range from 5:1 to 1:5.

3. The process according to claim 1, wherein the polyamine P used is a compound of formula (II)

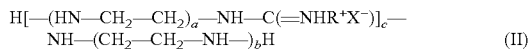   (II)

which is obtained by reacting a guanidine salt with a compound of formula (I),

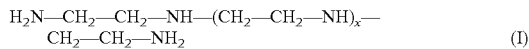   (I)

wherein x=1,
wherein in formula (II)
a=independently 0 to 6,
b=3,
c=independently 1 to 4,
R=H or $(CH_2-CH_2-NH-)_dH$,
d=independently 0 to 6,
a may be 0 when d>0 and R is not H, or d may be 0 when a>0, or d and a
may each be 0,
$X^-$=anion, and
wherein said reaction of the guanidine salt with the polyamine of formula (I) is carried out with a molar ratio of guanidine salt to the polyamine of formula (I), which is in the range from 2:3 to 1:3.

4. The process according to claim 1, wherein the polyamine P and the carrier material are added separately from one another to the reaction mixture which serves to produce the polyurethane systems, the carrier material having been dispersed in a liquid, and wherein the polyurethane systems produced comprise from 0.1 to 3 wt % of a total amount of a carrier material and polyamine P.

5. The process according to claim 1, wherein the polyurethane systems produced are polyurethane foams, and the polyamine P and the carrier material are mixed with one another and then added to the reaction mixture which serves to produce the polyurethane systems.

6. A polyurethane foam system, obtained by the process according to claim 1.

7. The polyurethane foam system according to claim 6, wherein the polyurethane foam system includes from 0.001 to 10 wt %, of carrier material and polyamine P.

8. The polyurethane foam system according to claim 6, wherein the polyurethane foam system is a flexible polyurethane foam, a viscoelastic PU foam, an HR polyurethane foam, a semi-rigid polyurethane foam, a thermoformable polyurethane foam or an integral PU foam.

9. An article, selected from the group consisting of refrigerator insulation, an insulation panel, a sandwich element, pipe insulation, spray foam, 1-component can foam, 1.5-component can foam, a wood imitation article, modelling foam, packaging foam, a mattress, furniture cushioning, automotive seat cushioning, a headrest, a dashboard, an automotive interior, an automotive roof liner, a sound absorption material, a steering wheel, a shoe sole, carpet backing foam, filter foam, a sealing foam, an adhesive, and a coating comprising the polyurethane foam system according to claim 6.

10. A process for reducing aldehyde emission from polyurethane systems, comprising admixing to the polyurethane systems or precursors thereof a carrier material and a polyamine P wherein the polyamine P is a reaction product wherein the polyamine P results from the reaction of a guanidine salt with a polyamine of formula (I)

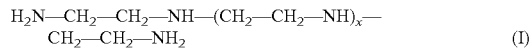   (I)

where x=1,
in an amount of from 0.001 to 10 wt %, based on the overall weight of the polyurethane systems and wherein a relative amount of carrier material based on an amount of polyamine P is 0.1 to 10 wt. %, wherein the admixing takes place before and/or during the production of the polyurethane systems,
wherein the carrier material used is a hydrophobized silica.

11. The process for production of polyurethane systems according to claim 1, wherein the polyurethane system produced have lower aldehyde emissions than otherwise equivalent polyurethane systems produced in the absence of polyamine P.

12. The process according to claim 1, wherein the polyamine P used is a compound of formula (II)

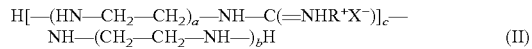   (II)

which is obtained by reacting a guanidine salt with a compound of formula (I),

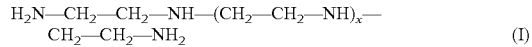   (I)

wherein x=1,
wherein in formula (II)
a=independently 3 to 5,
b=3,
c=independently 1 or 2,
R=H,
d=independently 3 to 5,
$X^-$=chloride, and
wherein said reaction of the guanidine salt with the polyamine of formula (I) is carried out with a molar ratio of guanidine salt to the polyamine of formula (I), which is in the range from 5:1 to 1:5.

13. The process according to claim 12, wherein a=b in the compound of formula (II).

14. A process for reducing aldehyde emission comprising formaldehyde, acetaldehyde, acrolein and benzaldehyde, from polyurethane foam systems, comprising admixing to the polyurethane foam systems or precursors thereof a carrier material and a polyamine P wherein the polyamine P results from the reaction of a guanidine salt with a polyamine of formula (I)

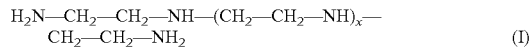   (I)

where x=1, in an amount of from 0.01 to 5 wt %, based on the overall weight of the polyurethane foam systems, wherein the admixing may take place before and/or during the production of the polyurethane foam systems, and
wherein the carrier material used is a hydrophobized silica and a relative amount of carrier material based on an amount of polyamine P is 0.1 to 10 wt. %.

* * * * *